Jan. 22, 1963 R. PAVIA 3,074,459
RADIUS CURVED DUCT FITTINGS WITH SNAPLOCK
Filed Feb. 26, 1960 2 Sheets-Sheet 1

Inventor
ROBERT PAVIA
By [signature]
Attorney

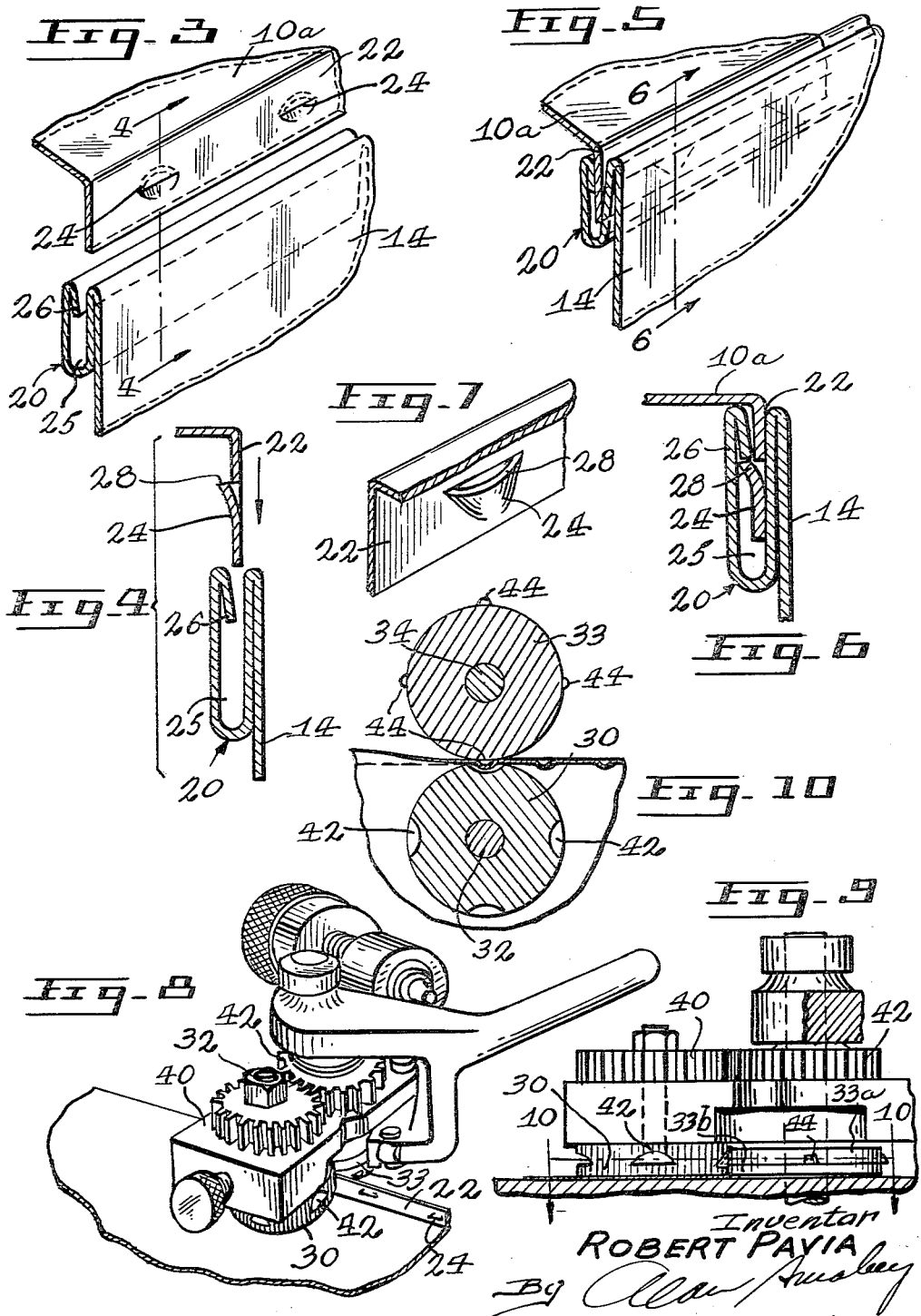

United States Patent Office  3,074,459
Patented Jan. 22, 1963

3,074,459
RADIUS CURVED DUCT FITTINGS
WITH SNAPLOCK
Robert Pavia, St. Eustache sur le Lac, Quebec, Canada, assignor to Metropolitan Oil & Gas Industries Inc., Montreal, Quebec, Canada
Filed Feb. 26, 1960, Ser. No. 11,304
2 Claims. (Cl. 153—2)

The present invention relates to improvements in the manufacture of sheet metal conduits or ducts and more particularly to a method and an apparatus for the making of curved or radius duct parts which can be easily and quickly assembled to form corner or elbow ducts in ducting systems.

At the present time the use of sheet metal ducts for the distribution of air and heating or air conditioning systems is common and there are many and varied types of ducts utilized and consequently many and varied types of apparatus utilized to manufacture such ducts.

In most cases, for convenience of handling, shipping, and manufacture, these ducts are made up of a combination of separate elements which are pre-manufactured on a production site and assembled on the job. Usually, the assembly of these units is accomplished by providing some system of interlocking flanges. These flanges in turn are normally produced by automatic machinery, for example power flangers or the like, which by means of a system of counter rotating power driven rolls form the edges of a sheet metal blank into upstanding flanges and seams which can be inserted one into the other to make the necessary connecting joints. Normally, although these joints can be readily made, it is necessary to lock the flanges in place, for example by the use of a "Pittsburgh" or "Irish" lock or by welding, as is well known in the trade. The use of integral pressed out studs or buttons is also known in combination with folded over flanges as a means for interlocking straight line sheet metal conduits or duct seams.

There is a problem however in the making of radius or curved ducts in that while the existing power flangers can make a flange on either a straight or curved blank of material they cannot, in their normal operation, incorporate any quick means for locking the units together when assembled.

The present invention recognizes this problem and aims to provide a means of making a quick locking joint on a power flanger for all radius or curved duct elements and also to provide an apparatus adapted for use in such a power flanger for making this method possible.

More specifically, the present invention provides a modified set of rollers adapted to suit a standard power flanger and which, in addition to the usual cooperating flanging faces, includes cooperating punches and dies which are adapted to punch out, in regularly spaced apart sequence, quick locking protuberances or buttons which are adapted to cooperate with a specially designed double fold seam to provide an automatic positive locking action to interlocking duct parts.

Having thus generally described the nature of the invention, particular reference will be made to the accompanying drawings wherein there is shown by way of illustration a preferred embodiment thereof, and in which:

FIGURE 3 is an enlarged detail view partially in section of a typical interlocking flange arrangement of the construction of FIGURE 1 prior to the interlocking assembly.

FIGURE 4 is a sectional view of the elements shown in FIGURE 3 to show the relative position of the locking buttons and flanges.

FIGURE 5 is a detail view corresponding to FIGURE 3 to show the flanged elements assembled in locked condition.

FIGURE 6 is a sectional view of FIGURE 5 along the line 6—6 to show the relative position of the interlocking button and flange.

FIGURE 7 is an enlarged detail view partially in section to show a typical locking button more clearly.

FIGURE 8 is a partial view in perspective elevation of a typical power flanger (upper portion) wherein a set of rolls constructed in accordance with the invention is utilized.

FIGURE 9 is a side view of the construction shown in FIGURE 8.

FIGURE 10 is a sectional view of the roller construction shown in FIGURE 9 along the line 10—10 to illustrate the construction more clearly.

Figure 1:
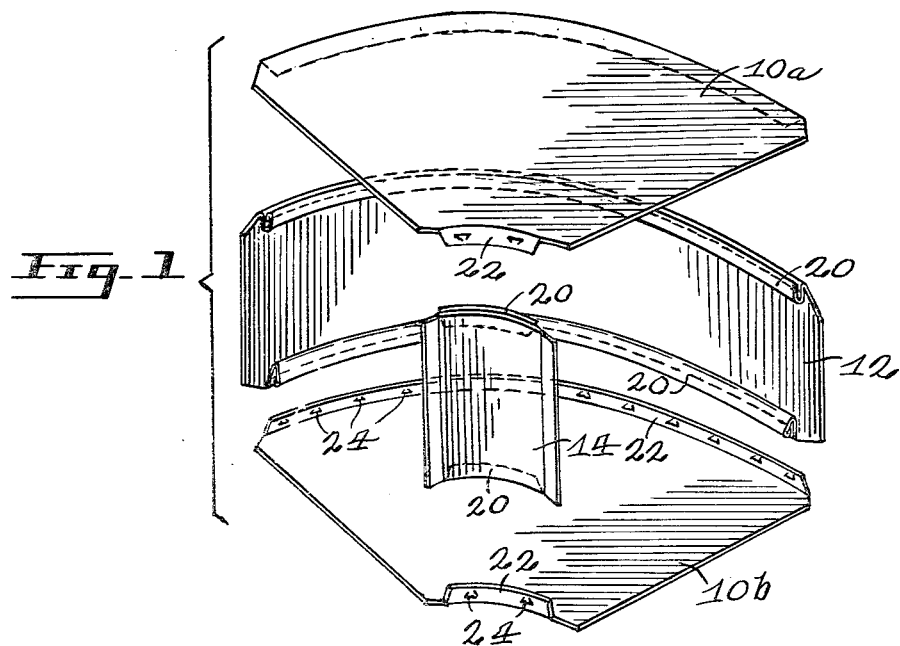
FIGURE 1 is an exploded view of the various flanged elements making up a typical ninety degree elbow for a duct system.
Figure 2:
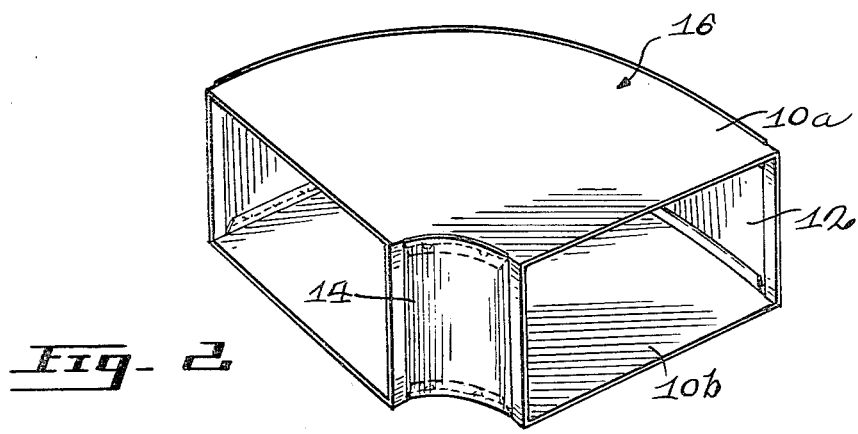
FIGURE 2 is a view in perspective elevation of the duct elements of FIGURE 1 as shown in the assembled condition.

With particular reference to FIGURES 1-7 of the drawings, a typical example of the type of duct construction to which the invention is related is shown as comprising a top and bottom blank 10a, 10b, an outer wall blank 12 and an inner wall blank 14. These elements when combined form a rectangular sectioned ninety degree elbow duct 16 as shown in FIGURE 2. As can be seen in more detail in FIGURE 1, both marginal edges of the outer wall 12 and inner wall 14 are provided with double folded seam flanges 20 as shown for example in FIGURE 3, while the top and bottom blanks are provided with straight flanges 22 provided with a series of spaced apart locking protuberances or buttons 24, see FIGURES 4 and 7 for example.

The radius flanges 20 are formed so as to have a main flange receiving recess 25 with a relatively short locking flange 26 provided along the upper inner margin and directed towards the bottom of the flange receiving recess and it is the lower edge of the flange 26 which cooperates with the upper outstanding lip 28 of each of the buttons 24 to achieve the locking effect shown in FIGURE 6.

The flanges 20 are produced by standard rolls, as is well known in the art, and it is not thought that any detailed explanation is necessary. It will be understood however that a particular formation including the inner flange 26 adapted for cooperation with the buttons 24 is not usual although their manufacture presents no difficulty on a standard multiple roll machine.

The production of the buttons 24 simultaneously with the forming of the radius of flanges 22 is a feature of the present invention and this is accomplished by means of a first roller 30 mounted on a shaft 32 forming part of a known power flanger, and a second roller 33 mounted on a driven shaft 34 also forming part of the power flanger. The construction and operation of this type of machine are well known and it is not thought necessary to describe these in detail beyond mentioning that in the example shown, a gear 40 is mounted on the shaft 32 and driven from the gear 42 mounted on the shaft 34 so as to provide a corresponding counter rotating drive to the rollers 30, 33.

The actual construction of the rollers 30, 33 is where the construction of the present invention differs from the known constructions to produce the effect desired. As can be seen more clearly in FIGURES 9 and 10, the roller 30 is provided with a series of indents or recesses 42 about its peripheral surface and these are formed so as to act as punching and forming dies in cooperation with a corresponding number of outstanding forming punches 44 provided on the roller 33. In the example shown in the present drawings, see FIGURE 10, there are four such punches and dies, but as will be appreciated these can be varied in number if desired.

With this arrangement, as the edge of the blank proceeds through the opposed rollers 30, 33, the flange 22 is formed and at the same time through the action of the punches 44 and dies 42 the buttons 24 are punched out in the flange 22 in regular spaced apart relationship.

A further feature of the present construction will be noted with reference to FIGURE 9 wherein it will be seen that in the preferred construction the roller 33 is made in two parts 33a, 33b with the upper part 33a bearing the punches 44, the lower part 33b forming the remainder of the flanger roll. The transaxial division between the rollers parts 33a, 33b is directly along the line of the cutting surface of the punches 44 so that when it is necessary to sharpen these punches it is a simple matter to separate the two roller portions and flat grind a new edge on the punches 44.

As will be appreciated by reference to the preceding description and the accompanying drawings, the present invention provides a means of manufacture of radius or curved duct elements on standard flanging equipment complete with locking buttons and ready for assembly without further operation. While emphasis has been made on the effectiveness of the present method in producing curved or radius ducts, it will be obvious that straight ducts can be produced equally as well by a simple adjustment of the power-flanging machine.

I claim:

1. As an attachment for a power flanging apparatus having a pair of spaced shafts extending therefrom, a pair of cooperating flange forming rollers fitting on said shafts in opposed cooperating relationship and being adapted to form an upstanding straight-walled flange about the arcuate peripheral edge of a flat sheet metal blank while simultaneously punching and forming a series of spaced apart outstanding locking buttons along said flange, one of said rollers bearing a plurality of circumferentially spaced apart forming and cutting punches about its outer periphery with the cutting face of each of said punches being flat along a plane extending transversely to the axis of said shafts, said punch bearing roller being divided transaxially into two parts along a plane of said punch cutting face, with the other of said rollers bearing a corresponding plurality of inwardly extending die recesses circumferentially spaced to register with said punches, the intervening portions of said first and second rollers between said punches and dies acting as cooperating flange rollers.

2. A pair of rollers as claimed in claim 1, wherein there are four cutting and forming dies on the first of said rollers and four corresponding cutting punches extending from the peripheral surface of the second of said rollers.

References Cited in the file of this patent

UNITED STATES PATENTS

| | | |
|---|---|---|
| 997,946 | Bair | July 18, 1911 |
| 1,028,749 | Leeper | June 4, 1912 |
| 1,938,318 | Colby | Dec. 5, 1933 |
| 2,051,640 | Kruse | Aug. 18, 1936 |
| 2,170,117 | Busch | Aug. 22, 1939 |
| 2,426,670 | Cooley | Sept. 2, 1947 |
| 2,460,296 | Kinney | Feb. 1, 1949 |
| 2,583,682 | Celousky | Jan. 29, 1952 |
| 2,748,866 | Zarnowski | July 5, 1956 |
| 2,802,487 | Breehl | Aug. 13, 1957 |
| 2,866,481 | Bratsch | Dec. 30, 1958 |